United States Patent
Song et al.

(10) Patent No.: US 10,765,284 B2
(45) Date of Patent: Sep. 8, 2020

(54) CLEANING ROBOT

(71) Applicant: LG Electronics Inc., Seoul (KR)

(72) Inventors: Hyunsup Song, Seoul (KR); Hanshin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 304 days.

(21) Appl. No.: 15/853,040

(22) Filed: Dec. 22, 2017

(65) Prior Publication Data

US 2018/0177372 A1 Jun. 28, 2018

(30) Foreign Application Priority Data

Dec. 23, 2016 (KR) ........................ 10-2016-0178615

(51) Int. Cl.
| | | |
|---|---|---|
| *A47L 9/28* | (2006.01) | |
| *H04N 5/225* | (2006.01) | |
| *B25J 9/16* | (2006.01) | |
| *A47L 9/30* | (2006.01) | |
| *B25J 11/00* | (2006.01) | |
| *A47L 9/06* | (2006.01) | |

(52) U.S. Cl.
CPC ............ *A47L 9/2852* (2013.01); *A47L 9/062* (2013.01); *A47L 9/281* (2013.01); *A47L 9/2847* (2013.01); *A47L 9/2894* (2013.01); *A47L 9/30* (2013.01); *B25J 9/1676* (2013.01); *B25J 9/1694* (2013.01); *B25J 9/1697* (2013.01); *H04N 5/2256* (2013.01); *A47L 2201/04* (2013.01); *A47L 2201/06* (2013.01); *B25J 11/0085* (2013.01); *G05B 2219/39091* (2013.01); *Y10S 901/01* (2013.01); *Y10S 901/47* (2013.01); *Y10S 901/49* (2013.01)

(58) Field of Classification Search
CPC ...... A47L 9/2852; A47L 9/281; A47L 9/2894; A47L 9/2847; A47L 9/30; A47L 9/062; A47L 2201/06; A47L 2201/04; A47L 9/28; B25J 9/1694; B25J 9/1676; B25J 9/1697; B25J 11/0085; H04N 5/2256; G05B 2219/39091; Y10S 901/47; Y10S 901/01; Y10S 901/49
USPC ......................................................... 15/319
See application file for complete search history.

(56) References Cited

U.S. PATENT DOCUMENTS

| | | | | |
|---|---|---|---|---|
| 5,377,106 A | * | 12/1994 | Drunk | G05D 1/0255 180/169 |
| 2011/0004342 A1 | * | 1/2011 | Knopow | A47L 5/28 700/253 |
| 2015/0015876 A1 | * | 1/2015 | Phillips | G01N 21/278 356/243.1 |
| 2016/0051104 A1 | * | 2/2016 | Shin | A47L 11/4072 15/3 |

* cited by examiner

*Primary Examiner* — David Redding
(74) *Attorney, Agent, or Firm* — Birch, Stewart, Kolasch & Birch, LLP (57) ABSTRACT

A cleaning robot includes a main body, a traveling part provided at a lower portion of the main body to enable the main body to move along a floor surface, a suction part provided at the main body to suck foreign materials from the floor surface, a cover provided on an exterior of the main body, and a recessed part recessed at a predetermined position of the cover, wherein the cover includes a first cover positioned above the recessed part, and a second cover which is positioned below the recessed part and has a greater width than the first cover.

16 Claims, 10 Drawing Sheets

CLEANING ROBOT

CROSS-REFERENCE TO RELATED APPLICATIONS

This application claims priority under 35 U.S.C. 119 to Korean Patent Application No. 10-2016-0178615, filed on Dec. 23, 2016, in the Korean Intellectual Property Office, the disclosure of which is incorporated herein by reference.

FIELD

The present invention relates to a cleaning robot for performing a cleaning operation while traveling about a predetermined region.

BACKGROUND

Recently, with the development of autonomous traveling technology and automatic control technology, functions of a traveling device and, more particularly, a robot, have been increased.

Each technology will now be described. Autonomous traveling technology refers to technology for enabling a machine to autonomously move to avoid an obstacle. According to autonomous traveling technology, a robot autonomously recognizes a position thereof through a sensor and moves to avoid an obstacle.

Automatic control technology refers to technology for enabling a machine to feed values measured by examining the state of the machine back to a control device to automatically control operation of the machine. Accordingly, the machine can be controlled without human manipulation and can be automatically controlled to be positioned within a target range, that is, to reach a target point.

With the development and combination of the above-described technologies, an intelligent robot can be implemented and a variety of information and services can be provided through the intelligent robot.

The robot is generally applicable to industrial fields, medical fields, space-related fields and ocean-related fields. For example, a robot may perform repeated operation in machining processes such as automobile production. That is, when a person inputs an operation to be performed, industrial robots repeat the received operation.

In addition, technology for mounting a camera in a robot was conventionally implemented. A robot may recognize a position thereof or an obstacle using a camera. In addition, a captured image can be displayed on a display unit.

SUMMARY

An object of the present embodiment is to provide a cleaning robot capable of sensing obstacles located at various positions to improve stability during traveling.

Another object of the present embodiment is to provide a cleaning robot capable of avoiding an obstacle located on the ground at a low height during traveling.

Another object of the present embodiment is to provide a cleaning robot capable of sensing a step difference such as a stair during traveling to prevent the cleaning robot from being damaged or broken.

Another object of the present embodiment is to provide a cleaning robot capable of accurately sensing a current position thereof during traveling even when a plurality of obstacles is located at a front side of the cleaning robot.

In order to provide a cleaning robot capable of improving stability during traveling, a cleaning robot may include a cover surrounding the outside of a main body and forming the appearance of the cleaning robot. The cover may include a first cover positioned above a recessed part which is recessed at a predetermined position of the cover, and a second cover positioned below the recessed part. The second cover has a greater width than the first cover.

In order to provide a cleaning robot capable of sensing obstacles located at various positions, a cleaning robot may include a first lidar sensor provided in a first recessed part to sense obstacles located at a front side and both lateral sides thereof and a second lidar sensor provided in a second recessed part to sense obstacles located at a rear side and lateral sides thereof.

In order to provide a cleaning robot capable of sensing an obstacle located on the ground at a low height during traveling, a cleaning robot may include infrared sensors located to be spaced apart from each other along a lower circumference of a second cover or a bottom cover. The infrared sensors may be directed downward at a predetermined angle.

In order to provide a cleaning robot capable of sensing a step difference of the ground, such as a stair, during traveling to prevent the cleaning robot from being damaged or broken, the cleaning robot may include a plurality of cliff sensors spaced apart from each other at a bottom thereof.

In order to provide a cleaning robot capable of accurately sensing a current position of the cleaning robot during traveling even when a plurality of obstacles is located at a front side of the cleaning robot, the cleaning robot may include a SLAM camera received in a first cover or a top cover. The first cover may include a light transmission unit for transmitting light to the SLAM camera. In particular, the SLAM camera may be directed upward at a predetermined angle from the horizon.

Accordingly, a cleaning robot according to the invention may include a main body, a traveling part provided at a lower portion of the main body to enable the main body to move along a floor surface, a suction part provided at the main body to suck foreign materials from the floor surface, a cover provided on an exterior of the main body, the cover including a first cover and a second cover, and a recess provided at the cover, the recess extending across at least one side of the cleaning robot, wherein at least a portion of the first cover is positioned above the recess, wherein at least a portion of the second cover is positioned below the recess, and wherein the second cover has a width greater than a width of the first cover.

The traveling part may include a plurality of wheels.

A front side of the second cover may protrude outwardly from an upper end of the second cover by a first horizontal distance, and a rear side of the second cover may protrude outwardly from the upper end of the second cover by a second horizontal distance, such that the first horizontal distance is greater than the second horizontal distance.

The recess may include a first recess recessed inward at a first position of the cover, and a second recess recessed inward at a second position of the cover. The first position may be a front side of the cover and the second position may be a rear side of the cover. The first recess may horizontally extend from the front side of the cover to both lateral sides of the cover, and the second recess may horizontally extend from the rear side of the cover to both lateral sides of the cover. A horizontal length of the first recess may be greater than a horizontal length of the second recess, and the first recess may extend horizontally rearwardly beyond a center of the side surface of the cover.

The second cover may include a third cover surrounding a side surface of the traveling part, the third cover being provided at a center of a side surface of the second cover.

The cleaning robot may include a side brush protruding from a front lower end of the main body.

The cleaning robot may include a first sensor provided in the first recess, and a second sensor provided in the second recess. The first sensor may be located closer to a vertical central axis of the second cover than the second sensor.

The cleaning robot may include one or more infrared sensors spaced apart from each other and provided along a lower periphery of the second cover, and the one or more infrared sensors may be directed downward at a predetermined angle.

The cleaning robot may include a plurality of cliff sensors provided at a bottom of the cleaning robot and spaced apart from each other.

The cleaning robot may include a light transmission member provided at a front side of the first cover, and a camera provided in the first cover, the camera being located behind the light transmission member. The camera may be directed upward at a predetermined angle with respect to a horizontal line.

Also, a cleaning robot according to the invention may include a main body, a traveling part provided at a lower portion of the main body to enable the main body to move along a floor surface, a suction part provided at the main body to suck foreign materials from the floor surface, a cover provided on an exterior of the main body, and a recess provided at the cover, the recess extending across at least one side of the cleaning robot, wherein the recess is recessed inward at a predetermined position of the cover to divide the cover into an upper cover portion and a lower cover portion, and wherein the lower cover portion has a width greater than a width of the upper cover portion.

The recess may include a first recess recessed inward from a front side of the cleaning robot at a first height above the floor surface, and a second recess recessed inward from a rear side of the cleaning robot at a second height above the floor surface different from the first height, such that a height of the lower cover portion extends to the first recess and to the second recess.

Finally, a cleaning robot according to the invention may include a main body, a traveling part provided at a lower portion of the main body to enable the main body to move along a floor surface, a suction part provided at the main body to suck foreign materials from the floor surface, a cover provided on an exterior of the main body, a first recess provided at the cover, the first recess extending horizontally across a front side of the cleaning robot, a second recess provided at the cover, the second recess extending horizontally across a rear side of the cleaning robot, a first sensor provided in the first recess and a second sensor provided in the second recess, one or more low obstacle sensors spaced apart from each other and provided along a lower periphery of the cover, a plurality of spaced apart cliff sensors provided at a bottom of the cleaning robot, and a camera provided at an upper portion of the cover, wherein a lower portion of the cover located below the first and second recesses has a width greater than a width of the upper portion of the cover located above the first and second recesses.

A front side of the lower portion of the cover may protrudes outwardly from an upper end of the lower portion of the cover by a first horizontal distance, and a rear side of the lower portion of the cover protrudes outwardly from the upper end of the lower portion of the cover by a second horizontal distance, such that the first horizontal distance is greater than the second horizontal distance.

DETAILED DESCRIPTION OF THE PREFERRED EMBODIMENT

A traveling device refers to a device which can move from a specific position to another position using power. The traveling device may be divided into an automatic traveling device and a manual traveling device. The automatic traveling device may refer to a traveling device which autonomously travels along a predetermined path without user manipulation. As an example of the traveling device, there is a movable robot. The movable robot may perform various operations while moving using traveling parts, e.g., wheels or legs.

For convenience of description, in this specification, the present invention will be described using a cleaning robot. The cleaning robot may mean a robot for performing a cleaning operation while moving about a specific region. For example, the cleaning robot may include an airport cleaning robot for performing a cleaning operation while moving about a wide space such as an airport.

The present invention is not limited to the cleaning robot and is applicable to a traveling device including a cleaning robot.

Figure 1:
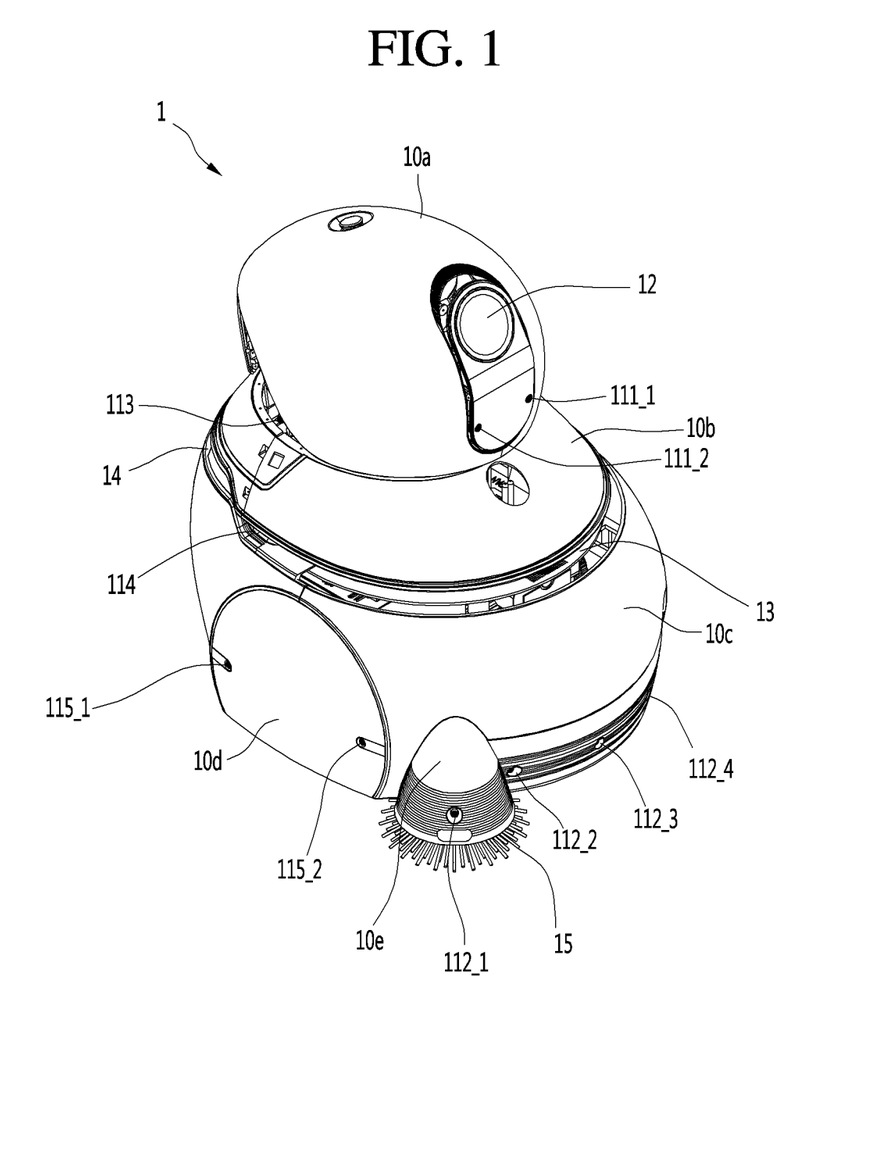
FIG. 1 is a diagram showing the appearance of a cleaning robot according to an embodiment of the present invention.

FIG. 1 is a diagram showing the appearance of a cleaning robot according to an embodiment of the present invention.

Figure 2:
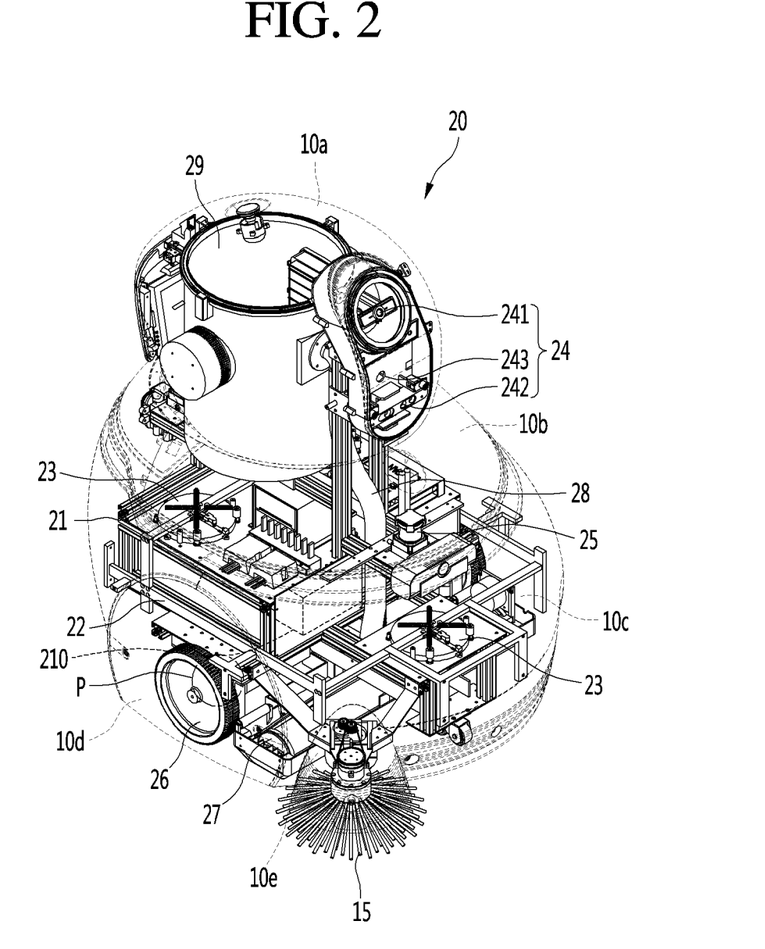
FIG. 2 is a perspective view showing a main body provided in a cleaning robot according to an embodiment of the present invention.

Referring to FIG. 1, the cleaning robot 1 includes covers 10a, 10b, 10c, 10d and 10e (collectively, 10) covering various components provided in a main body 20 (see FIG. 2). The cover 10 surrounds the outside of the main body 20 to form the appearance of the cleaning robot 1.

For example, the cover 10 may include a top cover 10a, a middle cover 10b provided below the top cover 10a and a bottom cover 10c provided below the middle cover 10b. The top cover 10a, the middle cover 10b and the bottom cover 10c may be integrally formed as one cover or may be separately formed as separate covers.

The top cover 10a may be located at the uppermost end of the cleaning robot 1. For example, the top cover 10a may be formed in a dome shape, without being limited thereto. Although not shown, a manipulation unit for receiving a command from a user may be provided at a rear side of the top cover 10a. The top cover 10a may include a light transmission unit 12 for enabling at least one camera provided in the main body 20 to capture the periphery (e.g., the front side) of the cleaning robot 1. The light transmission unit 12 may be placed at one side of a front surface of the top cover 10a. The light transmission unit 12 may be made of a material for transmitting light, such as glass, plastic, acryl, etc., without being limited thereto. The at least one camera may collect light reflected from objects located near the cleaning robot 1 and received through the light transmission unit 12, thereby capturing the objects located near the cleaning robot 1. Examples of the at least one camera will be described below with reference to FIG. 10.

The top cover 10a may be located at a height for enabling a user to easily use the manipulation unit and enabling the camera to recognize a user's face or to more accurately recognize a current position of the cleaning robot. For example, the top cover 10a may be located at a height (e.g., about 140 cm) less than the height of an adult.

In some embodiments, the top cover 10a may rotate forward around a front lower end of the cleaning robot 1 as a rotation axis. Therefore, the top cover 10a may be opened.

The middle cover 10b may be provided below the top cover 10a. The width of the middle cover 10b may be gradually increased from the upper side to the lower side thereof. For example, if the middle cover 10b has a cylindrical shape, the diameter of the middle cover 10b may be increased from the upper side to the lower side thereof. In some embodiments, the middle cover 10b may be included in the top cover 10a. In this case, the recessed parts 13 and 14 may be recessed at predetermined positions of the cover 10, so that the cover 10 may be divided into a top cover and a bottom cover with respect to recessed parts 13 and 14. That is, the recessed parts 13 and 14 may be recessed between the top cover and the bottom cover.

The bottom cover 10c may be provided below the middle cover 10b. The bottom cover 10c may have a greater width than the top cover 10a and the middle cover 10b. That is, the bottom cover 10c may be wider than the top cover 10a and the middle cover 10b in a horizontal direction. For example, if the middle cover 10b and the bottom cover 10c have a cylindrical shape, the diameter of the bottom cover 10c may be greater than that of the middle cover 10b. As the bottom cover 10c has a greater width than the top cover 10a and the middle cover 10b, a phenomenon wherein the cleaning robot 1 is turned over during traveling can be reduced. Accordingly, it is possible to improve stability while the cleaning robot 1 travels.

A battery, traveling parts (e.g., wheels), various boards (e.g., printed circuit boards (PCBs)), etc. may be provided in the bottom cover 10c. In some embodiments, the bottom cover 10c may be formed to surround the outsides of the traveling parts 26 (see FIG. 2). In another embodiment, the bottom cover 10c may include traveling-unit covers 10d and 10f, referring to FIG. 8, surrounding the outsides of the traveling parts 26. In another embodiment, if a side brush 15 protruding to a front lower end of the cleaning robot 1 is provided, the bottom cover 10c may be formed to surround the outside of the side brush 15. In some embodiments, the bottom cover 10c may further include a side-brush cover 10e surrounding the outside of the side brush 15.

The cover 10 may include a plurality of sensors 111_1 to 115_2 (collectively referred to as a sensor unit 11) for sensing whether an object is present within a predetermined distance from the cleaning robot 1. The object may include an obstacle which may influence traveling of the cleaning robot 1, such as a person, a thing, a wall, another robot, etc.

For example, the sensor unit 11 may be implemented by an ultrasonic sensor. The sensor unit 11 is not limited thereto and may include various sensors for sensing an object. The ultrasonic sensor may measure a difference between a time when ultrasonic waves are emitted and a time when the ultrasonic waves are returned from the object, thereby measuring a distance from the object.

The sensor unit 11 may be provided at various positions of the cover 10, for example, the top cover 10a, the middle cover 10b and the bottom cover 10c, to sense the object. Arrangement of the sensor unit 11 will be described in greater detail with reference to FIGS. 4 to 7.

Meanwhile, the cover 10 may include a first recessed part 13 and a second recessed part 14. The first recessed part 13 and the second recessed part 14 may be recessed from the outside of the cover 10 to the inside of the robot. When viewed from a different standpoint, the first recessed part 13 may be recessed inward from the front side of the cleaning robot 1 and the second recessed part 14 may be recessed inward from the rear side of the cleaning robot 1.

The first recessed part 13 may horizontally extend from the front side to both lateral sides of the cleaning robot 1. In some embodiments, the first recessed part 13 horizontally extending from the front side to both lateral sides of the cleaning robot may extend to the rear side of the side surface of the cleaning robot beyond the center of the side surface of the cleaning robot 1. In this case, the angle of the surface in which the first recessed part 13 is formed may exceed 180° (e.g., 270°).

The second recessed part 14 may horizontally extend from the rear side to both lateral sides of the cleaning robot 1. For example, the angle of the surface in which the second recessed part 14 is formed may be 180°, without being limited thereto.

The top cover 10a and the middle cover 10b are positioned above the first recessed part 13 and the second recessed part 14, and the bottom cover 10c may be positioned below the first recessed part 13 and the second recessed part 14. In some embodiments, an inner wall may be vertically formed in the first recessed part 13 and the second recessed part 14. In some embodiments, the inner wall may connect the middle cover 10b (or the top cover) and the bottom cover 10c to each other.

The positions of the first recessed part 13 and the second recessed part 14 may be variously changed. For convenience of description, assume that the top cover includes the middle cover 10b. In the case of the cover 10 in which the top cover 10a and 10b and the bottom cover 10c are integrally formed, the cover 10 may be divided into the top cover 10a and 10b and the bottom cover 10c or an upper cover and a lower cover by the first recessed part 13 and the second recessed part 14.

In contrast, if the top cover 10a and 10b and the bottom cover 10c are separately formed, the first recessed part 13 and the second recessed part 14 may be formed between the top cover 10a and 10b and the bottom cover 10c. In some embodiments, the first recessed part 13 may be formed in any one of the top cover 10a and 10b and the bottom cover 10c and the second recessed part 14 may be formed in the other of the top cover 10a and 10b and the bottom cover 10c. For example, the first recessed part 13 may be recessed inward at a predetermined position of the bottom cover 10c, and the second recessed part 14 may be recessed inward at a predetermined position of the top cover 10a. In another embodiment, the first recessed part 13 and the second recessed part 14 may be formed in any one of the top cover 10a and 10b and the bottom cover 10c.

Figure 3:
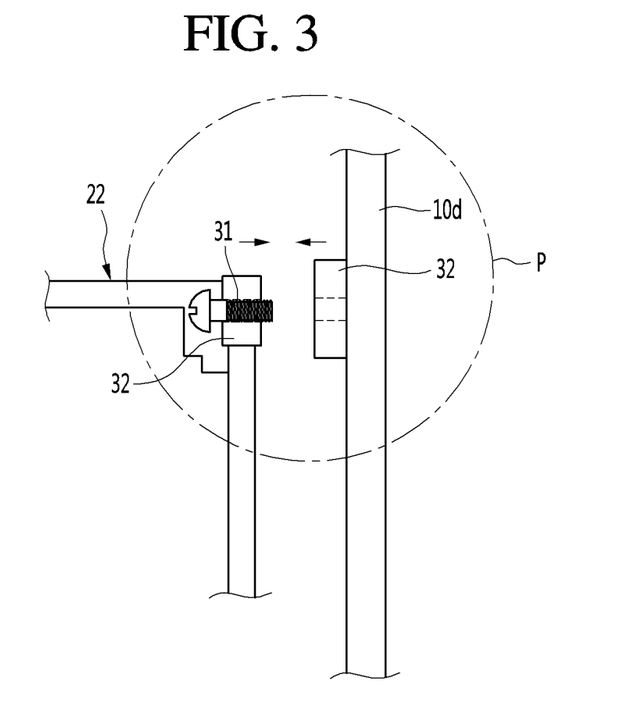
FIG. 3 is a diagram showing an example of a fastening structure between a cover and a movement frame of a cleaning robot according to an embodiment of the present invention.

FIG. 2 is a perspective view showing a main body provided in a cleaning robot according to an embodiment of the present invention, and FIG. 3 is a diagram showing an example of a fastening structure between a cover and a movement frame of a cleaning robot according to an embodiment of the present invention.

Referring to FIGS. 2 and 3, the main body 20 of the cleaning robot 1 may include a fixed body 21, a camera unit 24, a lidar sensor 25 and traveling parts 26. The components shown in FIG. 2 are not essential in implementation of the main body 20 of the cleaning robot 1. Accordingly, the main body 20 of the cleaning robot 1 described in this specification may have more or fewer components than the above-described components.

Specifically, among the above-described components, the fixed body 21 may be connected to various parts necessary for operation of the cleaning robot 1 and the other components. In this specification, the fixed body 21 may be a frame configuring the main body 20. The fixed body 21 may be received in the cover 10. That is, the cover 10 may be formed to surround the outside of the fixed body 21.

The fixed body 21 may include various boards for controlling overall operation of the cleaning robot 1. For example, the fixed body 21 may include some or all of a main board for managing overall driving of the cleaning robot 1, a board for processing data collected through the sensor unit 11, the camera unit 24 and the lidar sensor 25 and/or a board for controlling operation for supplying power of the battery 210 to the components included in the cleaning robot 1. The detailed structure of the fixed body 21 will be described below with reference to FIG. 4.

The battery 210 for supplying power necessary for operation of the cleaning robot 1 may be received in the fixed body 21. As components having large volumes or weights, such as the fixed body 21 and the battery 210, are received in the bottom cover 10c, the center of gravity of the cleaning robot 1 may be lowered. Accordingly, it is possible to further improve stability while the cleaning robot 1 travels.

In some embodiments, the main body 20 may further include a movement frame 22 fastened to the cover 10 to support the cover 10 relative to the fixed body 21. Specifically, the movement frame 22 may be fastened to the bottom cover 10c. For example, as shown in FIG. 3, the cover 10 (e.g., traveling-unit cover 10d) located at a fastening point P or the movement frame 22 may include a fastening boss 32 such that the cover 10 and the movement frame 22 are fastened to each other by a fastening screw 31 and the fastening boss 32. In some embodiments, the cover 10 or the movement frame 22 may include a plurality of fastening bosses such that the cover 10 and the movement frame 22 are fastened to each other at a plurality of points. The method of fastening the cover 10 and the movement frame 22 is not limited to the embodiment shown in FIG. 3 and various fastening methods may be used.

The camera unit 24 may be provided at the front side of the main body 20 to capture the front side of the cleaning robot 1. The camera unit 24 may include one or more cameras 241 to 243. For example, the camera unit 24 may include a simultaneous localization and mapping (SLAM) camera 241, a red, green, blue, distance (RGBD) camera 242, and a stereo camera (or stereoscopic camera 243. This will be described below with reference to FIG. 10.

The lidar sensor 25 is a laser radar and may be a sensor for irradiating laser beams, collecting and analyzing backwardly scattered light of light absorbed or scattered by an aerosol and recognizing an obstacle or a position of the cleaning robot. Although one lidar sensor 25 is provided at the front side of the fixed body 21 in FIG. 2, the lidar sensor 25 may be provided at the rear side of the fixed body 21. Such a lidar sensor 25 may be located in at least one of the first recessed part 13 and the second recessed part 14 to be located between the top cover 10a and the bottom cover 10c.

The traveling parts 26 may be provided below the fixed body 21. For example, the traveling parts 26 may be connected to a lower fixed body 21e (referring to FIG. 4). Although wheels 26 are shown as an example of the traveling parts 26 in FIG. 2, the traveling parts 26 may include legs in another embodiment. In addition, although two wheels are provided at both sides of the cleaning robot in this specification, the number of wheels may be variously changed.

The wheels 26 rotate based on rotation force applied by a driving unit (not shown), such that the cleaning robot 1 travels. In some embodiments, a caster for aiding traveling of the cleaning robot 1 may be provided at the front or rear side of the cleaning robot 1.

In some embodiments, the cleaning robot 1 may further include an elasticity setting unit 23 elastically supporting the movement frame 22 relative to the fixed body 21, a suction module 27 located in the bottom cover 10c for sucking in foreign materials on the ground, a cleaning module 29 for collecting the sucked foreign materials and a suction pipe 28 provided between the suction module 27 and the cleaning module 29. For example, the suction module 27 may further include a driving motor for rotating an agitator and a timing belt. The cleaning module 29 may include a dust collection motor and a dust collector.

Using the various components of the main body 20 described with reference to FIG. 2, the cleaning robot 1 may perform a cleaning operation while freely moving about a region of a specific place (e.g., an airport, etc.).

Hereinafter, the fixed body 21 provided in the main body 20 will be described in greater detail.

Figure 4:
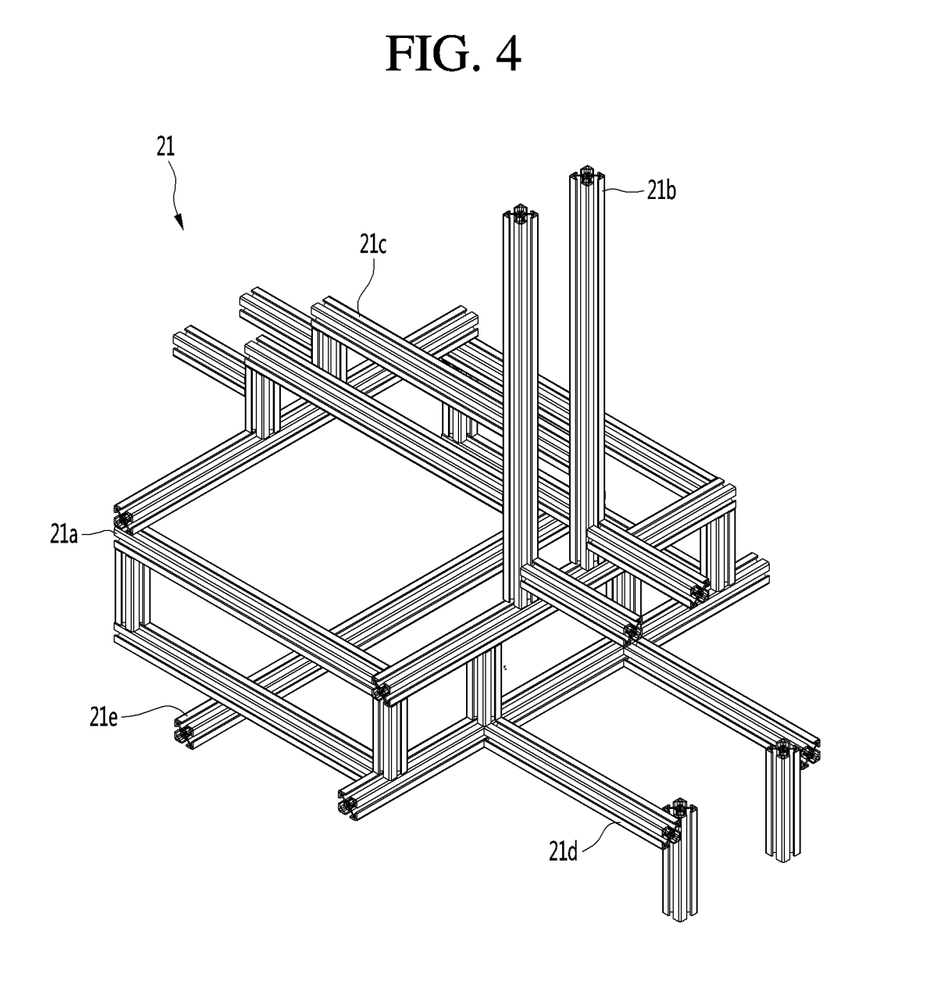
FIG. 4 is a diagram showing a fixed body included in a main body of a cleaning robot according to an embodiment of the present invention.

FIG. 4 is a perspective view showing a fixed body provided in a main body of a cleaning robot according to an embodiment of the present invention.

Referring to FIG. 4, the fixed body 21 may include a main fixed body 21a, a first upper fixed body 21b and a second upper fixed body 21c provided above the main fixed body 21a, a front fixed body 21d provided at the front side of the main fixed body 21a, and a lower fixed body 21e provided below the main fixed body 21a.

The main fixed body 21a may have a plurality of frames fastened to each other to form a three-dimensional structure having a predetermined volume and may form a basic frame of the main body 20. For example, as shown in FIG. 4, the main fixed body 21a may have a plurality of frames fastened to each other to have a rectangular parallelepiped shape but the shape of the main fixed body 21a is not limited to the rectangular parallelepiped shape. At least one plate may be fastened to the exterior of the main fixed body 21a and a battery 210 or a main board of the main body 20 may be provided in or above the main fixed body 21a.

The first upper fixed body 21b and the second upper fixed body 21c may be provided above the main fixed body 21a. The first upper fixed body 21b may include at least one frame extending in a longitudinal direction, and the second upper fixed body 21c may include at least one frame extending in a lateral direction toward the front and rear sides of the cleaning robot 1. For example, the camera unit 24 may be fixed to the first upper fixed body 21b toward the front side of the cleaning robot 1. In addition, the cleaning module 29 of FIG. 2 may be seated in the second upper fixed body 21c. In some embodiments, the cleaning module 29 may be fastened to the first upper fixed body 21b and the second upper fixed body 21c, thereby being more stably fixed.

The front fixed body 21d may be provided at the front side of the main fixed body 21a. In some embodiments, a caster assisting traveling of the traveling parts 26 may be fastened to the lower part of the front fixed body 21d.

The lower fixed body 21e may be provided below the main fixed body 21a. The lower fixed body 21e may include at least one frame extending in a lateral direction toward both lateral sides of the cleaning robot 1. The traveling parts 26 and the suction module 27 may be fastened to the lower fixed body 21e. In some embodiments, the suction module 27 may be fastened to at least one of the main fixed body 21a, the front fixed body 21d, and the lower fixed body 21e.

Hereinafter, arrangement and operation of various sensors and the cameras included in the cleaning robot according to the embodiment of the present invention will be described with reference to the drawings.

FIGS. 5 to 8 are diagrams showing examples of the sensors located at the front side, rear side and both lateral sides of the cleaning robot according to an embodiment of the present invention.

Figure 5:
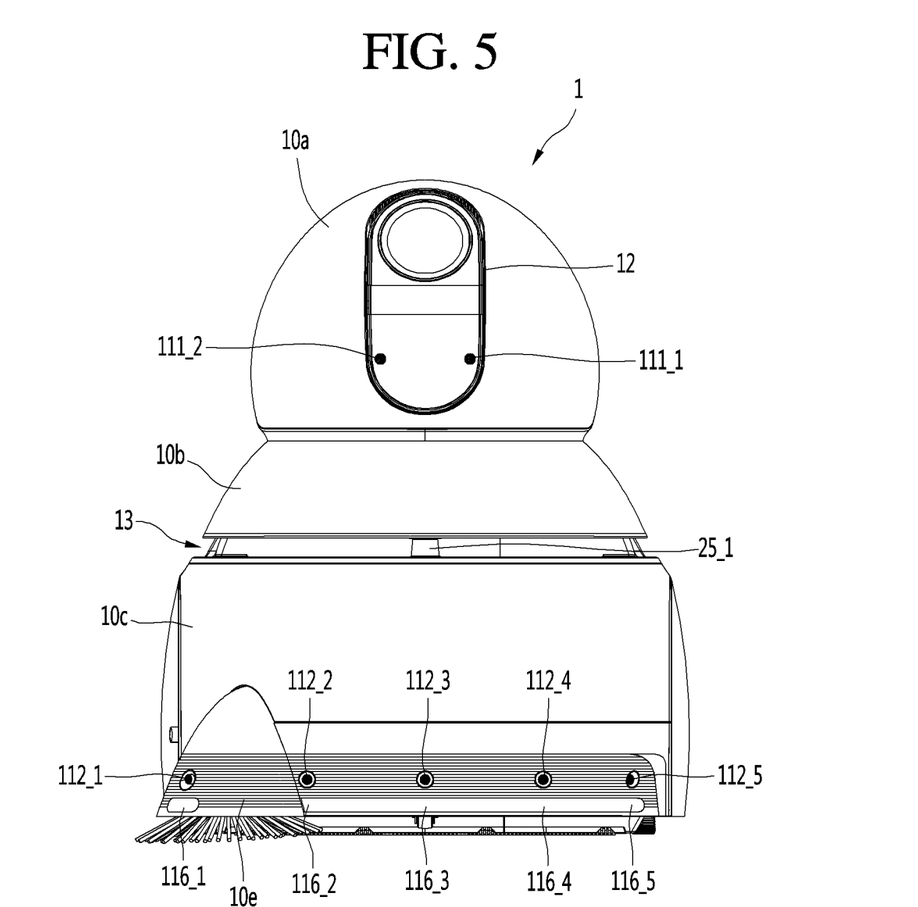
FIG. 5 is a diagram illustrating sensors provided at a front side of a cleaning robot according to an embodiment of the present invention.

Referring to FIG. 5, one or more sensors 111_1 to 111_2 and 112_1 to 112_5, a first lidar sensor 25_1 and one or more infrared sensors 116_1 to 116_5 may be provided at the front side of the cleaning robot 1.

As described above with reference to FIG. 1, the one or more sensors 111_1, 111_2 and 112_1 to 112_5 may be implemented by ultrasonic sensors. However, the one or more sensors 111_1, 111_2 and 112_1 to 112_5 are not limited thereto and may be implemented by various sensors for sensing an object.

For example, the one or more sensors 111_1, 111_2 and 112_1 to 112_5 may be spaced apart from each other at the front side of the top cover 10a and the front side of the bottom cover 10c. For example, the one or more sensors 112_1 to 112_5 may be spaced apart from each other along the front lower circumference of the bottom cover 10c. Accordingly, the second sensors 112_1 to 112_5 may sense objects located at the front side of the cleaning robot 1 in various directions. Arrangement of the one or more sensors 111_1 to 111_2 and 112_1 to 112_5 is not limited thereto and the one or more sensors 111_1 to 111_2 and 112_1 to 112_5 may be provided at various positions of the front side of the cleaning robot 1.

The first lidar sensor 25_1 may be located in the first recessed part 13. The first lidar sensor 25_1 provided in the main body 20 may be exposed through the first recessed part 13 in a horizontal direction. Since the first lidar sensor 25_1 is exposed to emit a necessary amount of laser beams, a probability of the first lidar sensor 25_1 being damaged by collision can be reduced.

The one or more infrared sensors 116_1 to 116_5 may be spaced apart from each other along the lower circumference (e.g., front lower circumference) of the bottom cover 10c. In particular, the one or more infrared sensors 116_1 to 116_5 may be provided to be directed downward at a predetermined angle. The one or more infrared sensors 116_1 to 116_5 may sense an obstacle located at a low height, such as a threshold formed on the ground. Therefore, the components provided at the lower end of the cleaning robot 1 can be prevented from being damaged or broken due to collision with an obstacle. For example, the one or more infrared sensors 116_1 to 116_5 may be implemented by position sensitive device (PSD) sensors, without being limited thereto.

That is, the cleaning robot 1 may sense an obstacle located at the front side of the cleaning robot 1 using the one or more sensors 111_1, 111_2 and 112_1 to 112_5, the first lidar sensor 25_1 and the one or more infrared sensors 116_1 to 116_5. When an obstacle is sensed through the sensors, a controller provided in the cleaning robot 1 may control the wheels 26 or the driving unit of the wheels 26 to avoid the sensed obstacle.

Figure 6:
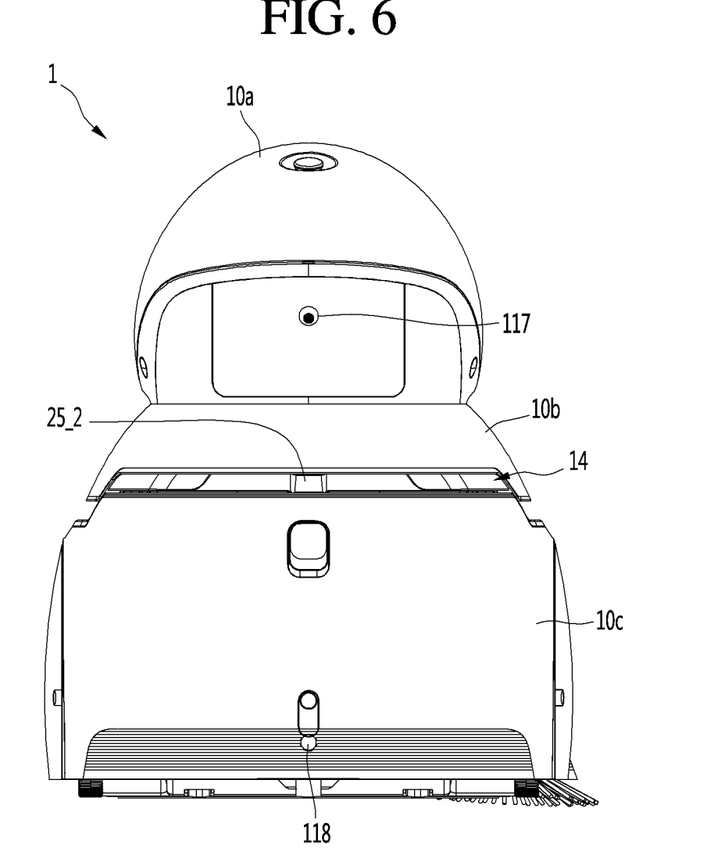
FIG. 6 is a diagram illustrating sensors provided at a rear side of a cleaning robot according to an embodiment of the present invention.

Referring to FIG. 6, one or more sensors 117 and 118 and a second lidar sensor 25_2 may be provided at the rear side of the cleaning robot 1. Similarly to FIG. 4, the sensors 117 and 118 may be implemented by ultrasonic sensors, without being limited thereto. The third sensor 117 may be provided at the rear side of the top cover 10a and the fourth sensor 118 may be provided at the rear side of the bottom cover 10c.

The second lidar sensor 25_2 may be located in the second recessed part 14. The second lidar sensor 25_2 provided in the main body 20 may be exposed through the second recessed part 14 in a horizontal direction. That is, since the second lidar sensor 25_2 is exposed to emit a necessary amount of laser beams, a probability of the second lidar sensor 25_2 being damaged by collision can be reduced. That is, as shown in FIGS. 5 and 6, the lidar sensors 25_1 and 25_2 may be located in the recessed parts 13 and 14, in order to prevent the lidar sensors 25_1 and 25_2 from being damaged.

Figure 7:
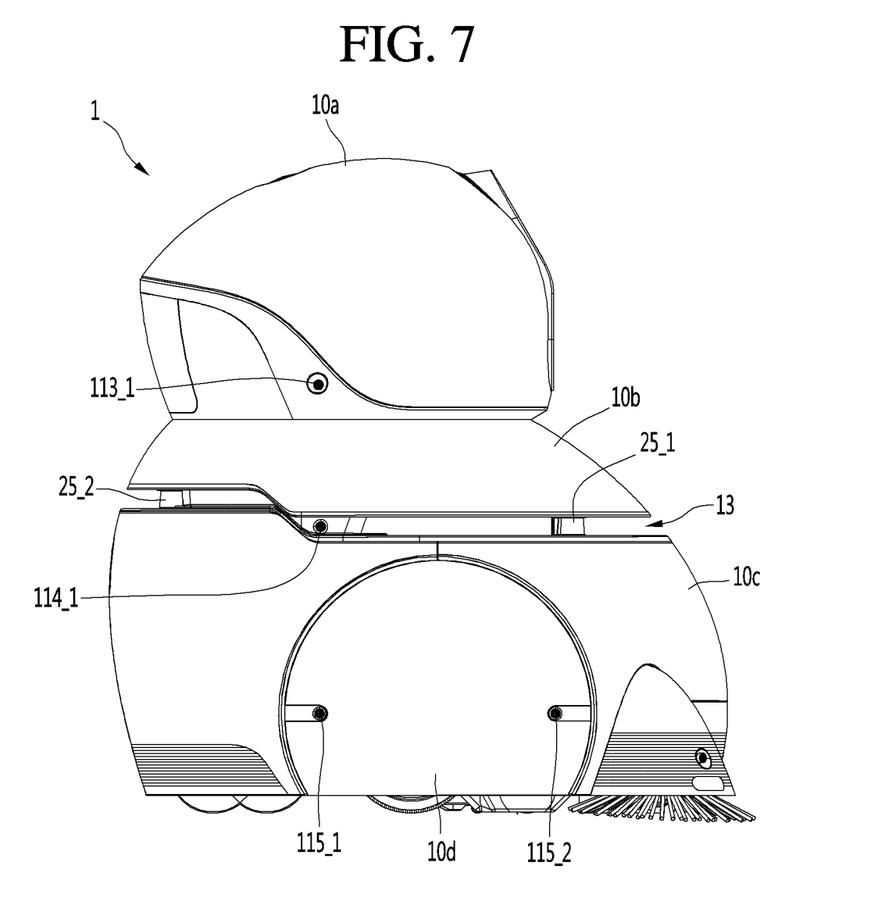
FIGS. 7 and 8 are diagrams illustrating sensors at both sides of a cleaning robot according to an embodiment of the present invention.
Figure 8:
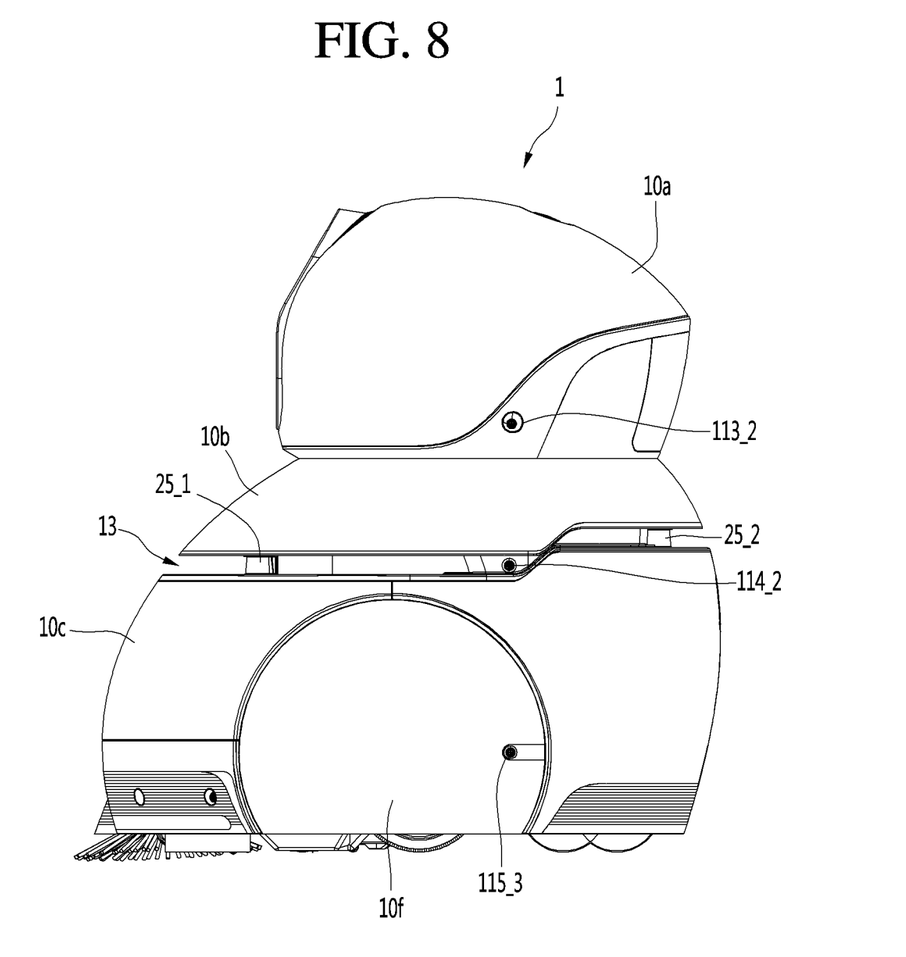

Referring to FIGS. 7 and 8, one or more sensors 113_1 to 113_2, 114_1 to 114_2, and 115_1 to 115_3 may be provided at both sides of the cleaning robot 1. Similarly to FIG. 4, the one or more sensors 113_1 to 113_2, 114_1 to 114_2, and 115_1 to 115_3 may be implemented by ultrasonic sensors, without being limited thereto.

For example, the fifth sensors 113_1 to 113_2 may be provided at both lateral sides of the top cover 10a. In some embodiments, if the first recessed part 13 and the second recessed part 14 extend to both lateral sides of the cleaning robot 1, the sixth sensors 114_1 and 114_2 may be provided in the front recessed part 13 extending to both lateral sides of the cleaning robot. In this case, the lidar sensors 25_1 to 25_2 provided at the front and rear sides of the cleaning robot 1 may be laterally exposed by the first recessed part 13 and the second recessed part 14 in a horizontal direction. The seventh sensors 115_1 to 115_3 may be provided in the bottom cover 10c or the traveling-unit covers 10d and 10f included in the bottom cover 10c.

As described above with reference to FIG. 1, the bottom cover 10c may have a greater width than the top cover 10a and the middle cover 10b. That is, since the width of the lower side of the cleaning robot 1 is greater than that of the upper side of the cleaning robot, a probability of the cleaning robot 1 being turned over upon traveling may be reduced. Accordingly, it is possible to improve stability while the cleaning robot 1 travels.

Meanwhile, the cleaning robot 1 performs a cleaning operation while traveling forward and thus the front side of the bottom cover 10c may collide with an obstacle. Therefore, since the front side of the bottom cover 10c may further protrude as compared to the rear side of the bottom cover, the components included in the cleaning robot 1 may be more efficiently protected from collision with or impact of an obstacle located at the front side of the cleaning robot.

The traveling-unit covers 10d and 10f provided in the bottom cover 10c may be provided at the centers of the lateral sides of the bottom cover 10c. In this case, the traveling parts 26 included in the main body 20 may also be provided in the centers of the lateral sides of the bottom cover 10c. Therefore, the cleaning robot 1 can travel while maintaining balance between the front and rear sides thereof.

The first recessed part 13 and the second recessed part 14 may be formed to expose the first lidar sensor 25_1 and the second lidar sensor 25_2 provided in the main body 20 in a horizontal direction. In this case, the heights of the first recessed part 13 and the second recessed part 14 may be different from each other. For example, the height of the first recessed part 13 may be less than that of the second recessed part 14. For example, the first recessed part 13 may be formed at a height of about 48 cm from the ground and the second recessed part 14 may be formed at a height of about 55 cm from the ground, thereby effectively sensing the obstacle located near the cleaning robot 1.

As the heights of the first recessed part 13 and the second recessed part 14 are different, it is possible to reduce a phenomenon wherein the lidar sensor 25_1 or 25_2 receive laser beams emitted from the lidar sensors of another cleaning robot to erroneously sense an obstacle.

In some embodiments, if the heights of the first recessed part 13 and the second recessed part 14 are different, the middle cover 10b and the bottom cover 10c may contact each other at a lateral boundary between the first recessed part 13 and the second recessed part 14.

The lidar sensors 25_1 and 25_2 may emit laser beams having straightness to sense an obstacle or a current position of the cleaning robot. That is, the width of the first recessed part 13 and the second recessed part 14 may be set such that the lidar sensors 25_1 and 25_2 horizontally emit laser beams. For example, the width may be 4 cm. That is, the first recessed part 13 and the second recessed part 14 minimally expose the lidar sensors 25_1 and 25_2, thereby preventing the lidar sensors 25_1 and 25_2 from being damaged or broken.

Referring to FIGS. 7 and 8, the first lidar sensor 25_1 may be located at the front side of the vertical central axis of the bottom cover 10c and the second lidar sensor 25_2 may be located at the rear side of the vertical central axis of the bottom cover 10c. The first lidar sensor 25_1 may be provided closer to the vertical central axis than the second lidar sensor 25_2. As described above, since the cleaning robot 1 mainly travels forward, the first lidar sensor 25_1 needs to be protected from impact. Therefore, the first lidar sensor 25_1 may be provided further inside the cleaning robot 1 than the second lidar sensor 25_2. However, since a space in which various components are provided needs to be located between the first lidar sensor 25_1 and the second lidar sensor 25_2, the first lidar sensor 25_1 is provided at a predetermined distance ahead of the vertical central axis of the bottom cover 10c.

The first lidar sensor 25_1 may sense an obstacle or an object located in an angle range (e.g., 270°) exceeding 180° with respect to the front side of the cleaning robot 1. In this case, if the first lidar sensor 25_1 is formed on the vertical central axis of the bottom cover 10c, the space in which the internal components are provided may be insufficient. Accordingly, the first lidar sensor 25_1 may be formed at a predetermined distance ahead of the vertical central axis.

The first recessed part 13 may be formed such that the first lidar sensor 25_1 emits laser beams in an angle range exceeding 180°. That is, the first recessed part 13 may horizontally extend from the front side to both lateral sides of the cleaning robot 1. In addition, since the first lidar sensor 25_1 is formed at a predetermined distance inward from the front side of the bottom cover 10c, the first recessed part 13 may horizontally extend to the rear side of the side surface of the bottom cover beyond the center of the side surface of the bottom cover 10c.

Meanwhile, the second lidar sensor 25_2 may have an angle range (e.g., 180°) less than that of the first lidar sensor 25_1. In addition, since the second lidar sensor 25_2 is formed further outside the cleaning robot 1 than the first lidar sensor 25_1, the second recessed part 14 may horizontally extend from the rear surface of the bottom cover 10c not to pass the center of the side surface.

That is, when viewing the side surface of the cleaning robot 1, the length of the first recessed part 13 may be greater than that of the second recessed part 14. In other words, the horizontal length of the first recessed part 13 may be greater than that of the second recessed part 14.

Figure 9:
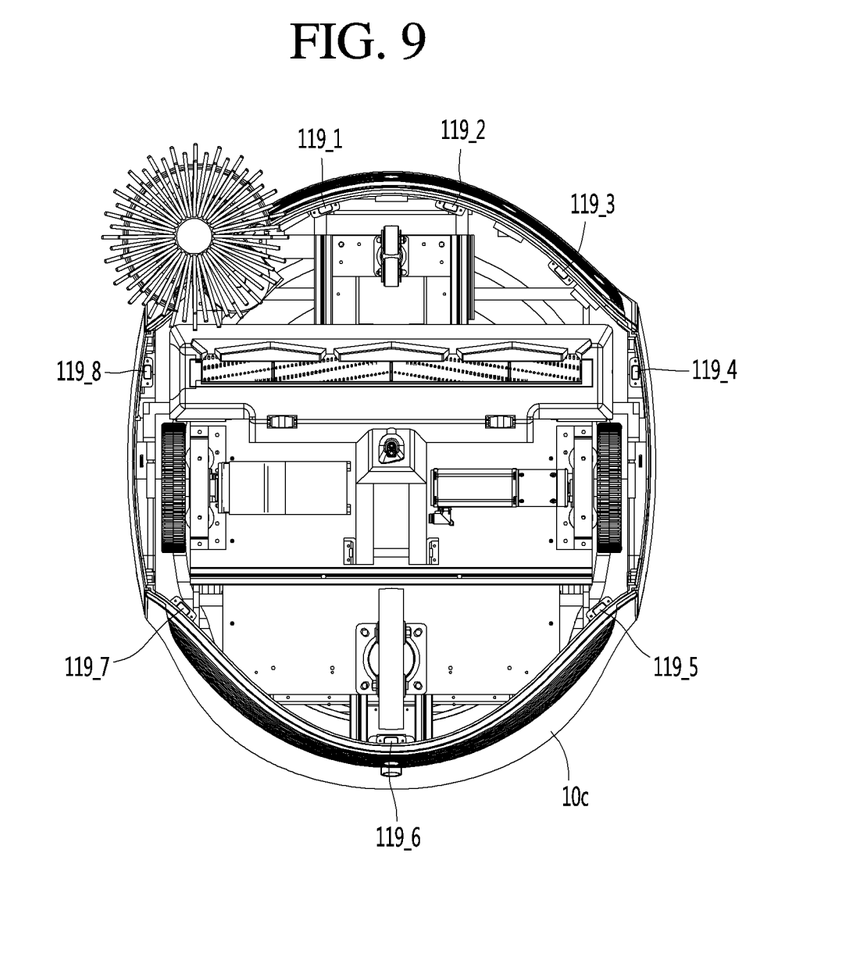
FIG. 9 is a diagram illustrating sensors provided at a bottom of a cleaning robot according to an embodiment of the present invention.

FIG. 9 is a diagram illustrating sensors provided at a bottom of a cleaning robot according to an embodiment of the present invention.

Referring to FIG. 9, a plurality of cliff sensors 119_1 to 119_8 may be provided at the bottom of the cleaning robot 1. The plurality of cliff sensors 119_1 to 119_8 may be spaced apart from each other at the bottom of the cleaning robot 1. For example, the plurality of cliff sensors 119_1 to 119_8 may be spaced apart from each other along the inner edge of the bottom of the bottom cover 10c.

The cleaning robot 1 may sense a step difference of the ground, such as a stair, using the cliff sensors 119_1 to 119_8.

Each of the cliff sensors 119_1 to 119_8 may periodically emit infrared rays and receive the emitted infrared rays. Each of the cliff sensors 119_1 to 119_8 may sense a distance between the bottom of the cleaning robot 1 and the ground based on a difference between an infrared-ray emission time and an infrared-ray reception time.

Based on the sensed result, the cleaning robot 1 may change a traveling direction such that the cleaning robot 1 does not travel to the front side of the ground where a stair or a step difference is located. Therefore, it is possible to prevent the cleaning robot 1 from falling over due to the stair or the step difference.

Figure 10:
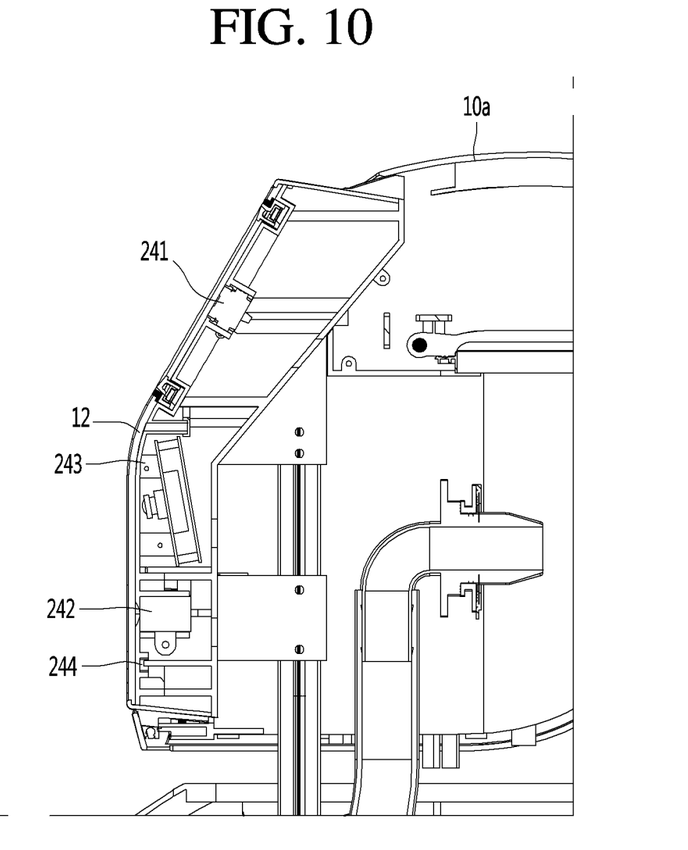
FIG. 10 is a diagram illustrating cameras provided in a cleaning robot according to an embodiment of the present invention.

FIG. 10 is a diagram illustrating cameras provided in cleaning robot according to an embodiment of the present invention.

Referring to FIG. 10, the cleaning robot 1 may include one or more cameras 241 to 244. The one or more cameras 241 to 244 may be disposed in the top cover 10a. In this case, the camera unit 24 may be connected to a first upper fixed body 21b located at the upper side of the fixed body 21. For example, the cleaning robot 1 may include a simultaneous localization and mapping camera (SLAM) camera 241, a red, green, blue, distance (RGBD) camera 242 and stereo (or a stereoscopic) cameras 243 and 244.

The SLAM camera 241 may implement simultaneous localization and mapping technology. The cleaning robot 1 may detect peripheral information using the SLAM camera 183, process the obtained information, generate a map corresponding to a mission-capable space and estimate an absolute position of the cleaning robot.

The RGBD camera 242 and the stereo cameras 243 and 244 may correspond to devices for detecting a person or thing located at the front side of the cleaning robot 1. The stereo camera 243 corresponds to a camera for detecting a person or thing using a stereoscopic image. The RGBD camera 242 corresponds to a camera for detecting a person or thing using images having depth data acquired by a camera having RGBD sensors.

Since the cleaning robot 1 performs a cleaning operation while moving forward, the cameras 241 to 244 may be provided at the front side of the cleaning robot 1 to capture the front side of the cleaning robot 1. In addition, the cameras 241 to 244 may be disposed in the top cover 10a in order to recognize the face of a person or in order to more accurately recognize a current position of the cleaning robot.

In particular, the SLAM camera 241 may sense the current position of the cleaning robot or perform a mapping operation while minimizing the influence of persons or obstacles, when the cleaning robot 1 is provided at a place where a large number of persons and obstacles are present, such as an airport. For example, the SLAM camera 241 is directed upward at a predetermined angle, thereby minimizing a problem that persons or obstacles are captured, thus decreasing accuracy in sensing of the current position of the cleaning robot. As the SLAM camera 241 is directed upward at the predetermined angle, the SLAM camera 241 may capture an object (e.g., a ceiling, a structure located at an elevated position, etc.) located at the front upper side of the cleaning robot 1 to sense the current position of the cleaning robot and to perform a mapping operation.

The RGBD camera 242 and the stereo cameras 243 and 244 may be provided to sense an obstacle such as a thing or a person located at the front side of the cleaning robot 1. At a place such as an airport, the majority of the obstacles may be persons. Accordingly, the RGBD camera 242 and the stereo cameras 243 and 244 may be provided in the top cover 10a of the cleaning robot 1.

In the cleaning robot 1 according to the embodiment of the present invention, the bottom cover 10c may have a greater width than the top cover 10a and the middle cover 10b. Therefore, since a probability of the cleaning robot 1 being turned over is reduced, the cleaning robot 1 may more stably travel.

In addition, as shown in FIGS. 5 to 10, in the cleaning robot 1 according to the embodiment of the present invention, since the sensors and the cameras are provided at various positions, obstacles located in various directions can be sensed and thus the cleaning robot can stably travel.

In particular, the plurality of infrared sensors 116_1 to 116_5 provided at the front side of the cleaning robot 1 may be directed downward at a predetermined angle, thereby sensing an obstacle located at a low height, such as a threshold. Therefore, it is possible to prevent the components provided at the lower end of the cleaning robot from being damaged or broken due to collision with the obstacle while the cleaning robot 1 travels.

In addition, the plurality of cliff sensors 119_1 to 119_8 provided at the bottom of the cleaning robot 1 sense the step difference of the ground, thereby preventing the cleaning robot 1 from being turned over or falling over due to the step difference while the cleaning robot travels.

In addition, the SLAM camera 241 provided on the front surface of the cleaning robot 1 is directed upward at a predetermined angle, thereby accurately checking the current position of the cleaning robot while minimizing the influence of users in the airport.

The arrangement of the sensors and cameras of the cleaning robot 1 according to the embodiment of the present invention is not limited to those described above with reference to FIGS. 5 to 10.

For example, the first recessed part 13 and the second recessed part 14 may be connected to each other to form one recessed part or more recessed parts may be formed. In addition, the positions of the first recessed part 13 and the second recessed part 14 may be changed. For example, the first recessed part 13 and the second recessed part 14 may be located between the top cover 10a and the middle cover 10b. In addition, the first recessed part 13 may be located between the middle cover 10b and the bottom cover 10c and the second recessed part 14 may be located between the top cover 10a and the middle cover 10b.

In addition, the positions of the sensors and cameras provided in the cover 10 may be freely changed. For example, although a sensor is not provided in the middle cover 10b in this specification, sensors may be located at the front side, rear side and/or both lateral sides of the middle cover 10b. As another example, sensors (ultrasonic sensors and infrared sensors) spaced apart from each other along the front lower circumference of the bottom cover 10c may be spaced apart from each other along the entire lower circumference of the bottom cover 10c. As another example, the SLAM camera 241 is located at the uppermost end of the top cover 10a and is directed vertically upward, thereby recognizing the current position of the cleaning robot using a structure located above the cleaning robot or a ceiling.

According to the embodiment of the present invention, the bottom cover of the cleaning robot has a greater width than the top cover and the middle cover of the cleaning robot. Therefore, the possibility for turning over of the cleaning robot is lower, thus the cleaning robot can stably travel.

Since the cleaning robot according to the embodiment of the present invention includes a lidar sensor for sensing obstacles located in a front direction, the cleaning robot can sense obstacles located in various directions and thus can stably travel. In addition, since the cleaning robot includes various sensors and cameras, the cleaning robot can sense obstacles located in various directions and thus can stably travel.

Since the plurality of infrared sensors provided at the lower end of the cleaning robot according to the embodiment of the present invention is provided to be directed downward at a predetermined angle, it is possible to sense an obstacle located at a low height, such as a threshold. Therefore, components provided at the lower end of the cleaning robot can be prevented from being damaged or broken due to collision with the obstacle during traveling.

Since the plurality of cliff sensors provided at the bottom of the cleaning robot senses a step difference of the ground, it is possible to prevent the cleaning robot from being turned over or falling over during traveling.

The SLAM camera provided in the top cover of the cleaning robot may be directed upward at a predetermined angle from the horizon. The SLAM camera may capture a ceiling or structure located at a front upper side of the cleaning robot, thereby sensing the current position of the cleaning robot. Therefore, the cleaning robot can accurately sense the current position thereof while minimizing influence of an obstacle such as a person or a thing located at the front side thereof.

What is claimed is:

1. A cleaning robot comprising:
   a main body;
   a plurality of wheels provided at a lower portion of the main body to enable the main body to move along a floor surface;

a dust collection motor provided at the main body to collect foreign materials sucked from the floor surface;
a cover provided on an exterior of the main body, the cover including a first cover and a second cover; and
a recess provided at the cover, the recess extending across at least one side of the cleaning robot,
wherein at least a portion of the first cover is positioned above the recess,
wherein at least a portion of the second cover is positioned below the recess,
wherein the second cover has a width greater than a width of the first cover,
wherein the recess includes a first recess recessed inward at a first position of the cover and a second recess recessed inward at a second position of the cover, and
wherein the cleaning robot further comprises a first sensor provided in the first recess and a second sensor provided in the second recess.

2. The cleaning robot according to claim 1, further comprising a side brush protruding from a front lower end of the main body.

3. The cleaning robot according to claim 1, wherein a front side of the second cover protrudes outwardly from an upper end of the second cover by a first horizontal distance,
wherein a rear side of the second cover protrudes outwardly from the upper end of the second cover by a second horizontal distance, and
wherein the first horizontal distance is greater than the second horizontal distance.

4. The cleaning robot according to claim 1, wherein the first position is a front side of the cover and the second position is a rear side of the cover.

5. The cleaning robot according to claim 4, wherein the first recess horizontally extends from the front side of the cover to both lateral sides of the cover, and
wherein the second recess horizontally extends from the rear side of the cover to both lateral sides of the cover.

6. The cleaning robot according to claim 5, wherein a horizontal length of the first recess is greater than a horizontal length of the second recess, and
wherein the first recess extends horizontally rearwardly beyond a center of the side surface of the cover.

7. The cleaning robot according to claim 1, wherein the first sensor is located closer to a vertical central axis of the second cover than the second sensor.

8. The cleaning robot according to claim 1, further comprising one or more infrared sensors spaced apart from each other and provided along a lower periphery of the second cover,
wherein the one or more infrared sensors are directed downward at a predetermined angle.

9. The cleaning robot according to claim 1, further comprising a plurality of cliff sensors provided at a bottom of the cleaning robot and spaced apart from each other.

10. The cleaning robot according to claim 1, further comprising a light transmission window provided at a front side of the first cover.

11. The cleaning robot according to claim 10, further comprising a camera provided in the first cover, the camera being located behind the light transmission window.

12. The cleaning robot according to claim 11, wherein the camera is directed upward at a predetermined angle with respect to a horizontal line.

13. The cleaning robot according to claim 1, wherein the second cover includes a third cover surrounding a side surface of the plurality of wheels, the third cover being provided at a center of a side surface of the second cover.

14. A cleaning robot comprising:
a main body;
a plurality of wheels provided at a lower portion of the main body to enable the main body to move along a floor surface;
a dust collection motor provided at the main body to collect foreign materials sucked from the floor surface;
a cover provided on an exterior of the main body; and
a recess provided at the cover, the recess extending across at least one side of the cleaning robot,
wherein the recess is recessed inward at a predetermined position of the cover to divide the cover into an upper cover portion and a lower cover portion,
wherein the lower cover portion has a width greater than a width of the upper cover portion,
wherein the recess comprises:
 a first recess recessed inward from a front side of the cleaning robot at a first height above the floor surface; and
 a second recess recessed inward from a rear side of the cleaning robot at a second height above the floor surface different from the first height, and
wherein a height of the lower cover portion extends to the first recess and to the second recess.

15. A cleaning robot comprising:
a main body;
a plurality of wheels provided at a lower portion of the main body to enable the main body to move along a floor surface;
a dust collection motor provided at the main body to collect foreign materials sucked from the floor surface;
a cover provided on an exterior of the main body;
a first recess provided at the cover, the first recess extending horizontally across a front side of the cleaning robot;
a second recess provided at the cover, the second recess extending horizontally across a rear side of the cleaning robot;
a first sensor provided in the first recess and a second sensor provided in the second recess;
one or more low obstacle sensors spaced apart from each other and provided along a lower periphery of the cover;
a plurality of spaced apart cliff sensors provided at a bottom of the cleaning robot; and
a camera provided at an upper portion of the cover,
wherein a lower portion of the cover located below the first and second recesses has a width greater than a width of the upper portion of the cover located above the first and second recesses.

16. The cleaning robot according to claim 15, wherein a front side of the lower portion of the cover protrudes outwardly from an upper end of the lower portion of the cover by a first horizontal distance,
wherein a rear side of the lower portion of the cover protrudes outwardly from the upper end of the lower portion of the cover by a second horizontal distance, and
wherein the first horizontal distance is greater than the second horizontal distance.

* * * * *